United States Patent
Lee et al.

(10) Patent No.: US 10,505,795 B2
(45) Date of Patent: Dec. 10, 2019

(54) METHOD FOR PROVIDING A TRIAL ENVIRONMENT TO ENABLE USER TO TRY OUT APPLICATION IN CLOUD ENVIRONMENT AND SERVER USING THE SAME

(71) Applicant: TMAXSOFT. CO., LTD., Gyeonggi-do (KR)

(72) Inventors: Young Gil Lee, Gwangju (KR); Myung Kuk Ko, Gyeonggi-do (KR)

(73) Assignee: TMAXSOFT. CO., LTD., Gyeonggi-do (KR)

( * ) Notice: Subject to any disclaimer, the term of this patent is extended or adjusted under 35 U.S.C. 154(b) by 191 days.

(21) Appl. No.: 15/658,961

(22) Filed: Jul. 25, 2017

(65) Prior Publication Data

US 2018/0034688 A1    Feb. 1, 2018

(30) Foreign Application Priority Data

Jul. 27, 2016    (KR) .................. 10-2016-0095663

(51) Int. Cl.
*G06F 9/24*    (2006.01)
*H04L 12/24*    (2006.01)
(Continued)

(52) U.S. Cl.
CPC ............ *H04L 41/0803* (2013.01); *G06F 8/63* (2013.01); *G06F 9/45558* (2013.01);
(Continued)

(58) Field of Classification Search
CPC . H04L 41/0803; H04L 41/0806; H04L 67/10; G06F 8/163; G06F 2009/45595; H06F 9/45558; H06F 2009/45562
(Continued)

(56) References Cited

U.S. PATENT DOCUMENTS

2002/0091918 A1 *  7/2002  Lakshman .......... G06F 9/44505
                                                            713/1
2002/0143568 A1 * 10/2002  Nakamura ............. G06Q 10/10
                                                            705/1.1
(Continued)

FOREIGN PATENT DOCUMENTS

KR    1020080063172 A    7/2008
KR    1020120096741 A    8/2012
(Continued)

*Primary Examiner* — Volvick Derose
(74) *Attorney, Agent, or Firm* — Husch Blackwell LLP

(57) ABSTRACT

A method for providing a trial environment to enable a user to try out at least one application in a cloud environment is provided. The method includes steps of: (a) if a selection of an application that the user prefers to try out is detected, acquiring information on a platform that is appropriate to run the application from related information of the application, and determining whether or not the trial environment built on the appropriate platform is available for the application to be run thereon; (b) if the trial environment is detected not to be available by referring to a result of the determination, configuring and setting the trial environment built on the appropriate platform to be available on the basis of the related information of the application; and (c) enabling the user to run the application in the available trial environment.

18 Claims, 5 Drawing Sheets

(51) Int. Cl.
*G06F 8/61* (2018.01)
*G06F 9/455* (2018.01)
*G06F 9/4401* (2018.01)
*H04L 29/08* (2006.01)

(52) U.S. Cl.
CPC ........ H04L 41/0806 (2013.01); *G06F 9/4401* (2013.01); *G06F 2009/45562* (2013.01); *G06F 2009/45595* (2013.01); *H04L 67/10* (2013.01); *H04L 67/22* (2013.01)

(58) Field of Classification Search
USPC ............................................................. 713/1
See application file for complete search history.

(56) References Cited

U.S. PATENT DOCUMENTS

| | | | | |
|---|---|---|---|---|
| 2003/0009747 A1* | 1/2003 | Duran | ............... | G06F 8/20 717/137 |
| 2003/0217188 A1* | 11/2003 | Kung | ............... | G06F 9/44505 719/310 |
| 2011/0138064 A1* | 6/2011 | Rieger | ............... | H04N 21/25816 709/228 |
| 2013/0007737 A1* | 1/2013 | Oh | ............... | G06F 9/452 718/1 |
| 2013/0065575 A1* | 3/2013 | Poon | ............... | H04W 4/70 455/418 |
| 2013/0219280 A1* | 8/2013 | Weinstein | ............... | H04L 65/1069 715/736 |
| 2014/0040880 A1* | 2/2014 | Brownlow | ............... | G06F 8/60 717/177 |
| 2014/0180666 A1* | 6/2014 | Muttik | ............... | G06F 9/455 703/27 |
| 2014/0289896 A1* | 9/2014 | Ostrander | ............... | A01H 5/10 800/275 |
| 2014/0344435 A1* | 11/2014 | Mortimore, Jr. | ............... | H04L 41/5051 709/223 |
| 2015/0278079 A1* | 10/2015 | Cheng | ............... | G06F 9/45558 718/1 |
| 2016/0100036 A1* | 4/2016 | Lo | ............... | H04L 67/42 709/203 |
| 2016/0371124 A1* | 12/2016 | Kim | ............... | G06F 9/5038 |
| 2017/0208150 A1* | 7/2017 | Ekbote | ............... | H04L 9/0643 |

FOREIGN PATENT DOCUMENTS

| | | |
|---|---|---|
| KR | 1020130007373 A | 1/2013 |
| KR | 1020130026609 A | 3/2013 |

\* cited by examiner

METHOD FOR PROVIDING A TRIAL ENVIRONMENT TO ENABLE USER TO TRY OUT APPLICATION IN CLOUD ENVIRONMENT AND SERVER USING THE SAME

CROSS REFERENCE TO RELATED APPLICATION

This application claims priority to and incorporates herein by reference all disclosure in Korean Patent Application No. 10-2016-0095663 filed Jul. 27, 2016.

FIELD OF THE INVENTION

The present invention relates to a method for providing a trial environment to enable a user to try out an application in a cloud environment and a server using the same, and more particularly, to the method for (i) acquiring or supporting another device to acquire information on a platform that is appropriate to run the application from related information of the application if a selection of the application that the user prefers to try out is detected, determining or supporting another device to determine whether or not the trial environment built on the appropriate platform is available for the application to be run thereon, (ii) configuring and setting or supporting another device to configure and set the trial environment built on the appropriate platform to be available on the basis of the related information of the application if the trial environment is detected not to be available by referring to a result of the determination, and (iii) enabling the user to run or supporting another device to enable the user to run the application in the available trial environment and the server using said method.

BACKGROUND OF THE INVENTION

Several types of PCs as well as various types of mobile devices using such platforms as Windows OS of Microsoft, OS X of Apple, and Linux OS etc. are prevailing in the recent software market. Demands on diverse applications not only for the PCs but also for the mobile devices are growing rapidly. As a result, a huge market is formed for the diverse applications including both free applications and paid applications. Besides, considerable number of the applications encompassing the applications for personal use and those for enterprises, e.g. web server, WAS, databases, and middleware, are available in the market. To try out the respective applications requires users to go through complicated environmental settings and to be equipped with appropriate infrastructure for services, e.g. high-end servers and storages, and thus a lot of times and resources are consumed.

From the users' point of view, selecting an application for use among the diverse applications is a hard choice due to that the users who want to make use of the application need to determine whether or not the application meets a usage end. A lot of applications with similar functions are constantly being released in the software market, and it is difficult for the users to exactly decide if the functions of an application are appropriate ones by only referring to product information provided by providers of the application. Conventionally, the users directly download a few applications for the purpose of trials and try them out to determine if the applications are worth purchasing if the applications are of paid applications. In such a case, when the applications downloaded and tried out by the users are not the ones that the users need, the users have to uninstall the applications, which causes inconveniences to the users.

Furthermore, if the users purchase an application that provides numerous functions, a variety of functions except for those required by the users may be used later, but the problem is that the more functions the application provides, the more it costs in most of the cases. Even for applications with similar or the same functions, price range of the applications may be wide. And it is preferable to purchase the applications with reasonable and affordable price.

Besides, after buying an application that the users need a while later, it is required for the users to download and install the application having been upgraded to figure out functions having been added into the application, since it is difficult for the users to figure out the functions having been added by merely referring to the descriptions of update contents.

There are lots of application products with new functionalities, friendly user interface, and reasonable prices among recently released applications. However, from the users' point of view, it is cumbersome and annoying for the users to install the products on a PC or a mobile device for the purpose of trial and uninstall them from the PC or the mobile device every time after trying out those products.

Moreover, in case of installing the latest software applications, there may be restrictions for the installation of the applications depending on computing environments, e.g. recommended hardware specification of a terminal which may be a PC or a mobile device and recommended network bandwidth etc. Or there may be a case that the users may no longer utilize the applications due to the trial periods are expired before the users fully explore the functions of the applications.

Therefore, the present invention intends to propose a method for configuring a trial environment in a way of software provisioning to enable the users to easily use a variety of free and paid applications in a virtual environment of a cloud system and using the configured applications immediately and a server using the same method.

SUMMARY OF THE INVENTION

It is an object of the present invention to solve all problems explained above.

It is another object of the present invention to enable a user to try out an application which the user have selected by acquiring information on a device of the user, e.g., CPU, memory, graphics specification, and network bandwidths etc., and running the application on an appropriate platform.

It is still another object of the present invention to facilitate a convenience of the user by enabling the user to focus only on trying out the application rather than on managing tasks of the application, e.g. an installation or deletion of the application by allowing the tasks of the application to be managed by using the available resources of a system in a cloud environment.

It is still yet another object of the present invention to remotely try out the application through a trial environment without a necessity of installing the application on the device of the user by providing the trial environment constructed in a format of a container built on a variety of platforms in a cloud environment.

In accordance with one example embodiment of the present invention, there is provided the method for providing a trial environment to enable a user to try out at least one application in a cloud environment, comprising steps of: (a) if a selection of an application that the user prefers to try out is detected, acquiring or supporting another device to acquire information on a platform that is appropriate to run the application from related information of the application, and determining or supporting another device to determine whether or not the trial environment built on the appropriate platform is available for the application to be run thereon; (b) if the trial environment is detected not to be available by referring to a result of the determination, configuring and setting or supporting another device to configure and set the trial environment built on the appropriate platform to be available on the basis of the related information of the application; and (c) enabling the user to run or supporting another device to enable the user to run the application in the available trial environment.

In accordance with another example embodiment of the present invention, there is provided a server for providing a trial environment to enable a user to try out at least one application in a cloud environment, comprising: a communication part for detecting a selection of an application that the user prefers to try out; and a processor for (i) acquiring or supporting another device to acquire information on a platform that is appropriate to run the application from related information of the application if the selection of the application that the user prefers to try out is detected, (ii) determining or supporting another device to determine whether or not the trial environment built on the appropriate platform is available for the application to be run thereon, (iii) configuring and setting or supporting another device to configure and set the trial environment built on the appropriate platform to be available on the basis of the related information of the application if the trial environment is detected as not available by referring to a result of the determination, and (iv) enabling the user to run or supporting another device to enable the user to run the application in the available trial environment.

BRIEF DESCRIPTION OF THE DRAWINGS

The drawings accompanied below are included to provide a further understanding of the present invention and are incorporated in as a part of this application to illustrate example embodiments of the present invention. And, together with the description, the drawings serve to explain the features of the present invention to those skilled in the pertinent art. Other drawings may be derived from these figures without any inventive work being done by a person skilled in the pertinent art.

DETAILED DESCRIPTION OF THE PREFERRED EMBODIMENTS

Figure 1:
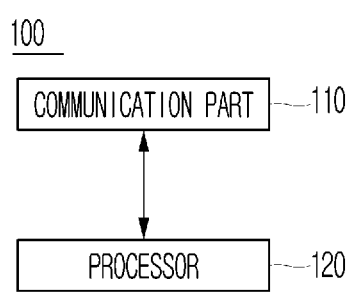
FIG. 1 is a block diagram schematically illustrating a configuration of a server for providing a trial environment to try out an application in accordance with the present invention.

The following detailed description of the present invention refers to the accompanying drawings, which illustrate, by way of example, specific embodiments in which the present invention may be practiced, in order to clarify the objects, technical solutions and advantages of the present invention. These embodiments are described in sufficient detail to enable those skilled in the related art to practice the present invention.

In this specification of the present invention, a "cloud environment" is a term referring to an infrastructure with respect to cloud computing. And a term "cloud computing" refers to a form of computing system within which mainly I/O operations are performed through a user device and operations of analyzing, processing, storing, managing, and distributing data are performed in a third space called "cloud."

In addition, a "platform" mentioned in this specification of the present invention refers to hardware specification, or a hardware architecture on which software is operable, or to a type of software framework including an application program framework. Generally, the platform may include a computer architecture, an operating system, a programming language, and a relevant runtime library or a GUI.

Herein, the "operating system", i.e. OS, may include not only those OSs of general-purpose computing devices, e.g. Microsoft's Windows, Apple's OS X, IBM's OS/2, Oracle's Solaris, Google's Chrome OS, FreeBSD, and Linux etc., but also mobile operating systems such as Android, Bada, Blackberry OS, iOS, Embedded Linux, Palm OS, and Windows Mobile etc., but it is not limited thereto. Besides, a "software framework" may include Adobe AIR, Java e.g. JDR and JRE, Mono, Mozilla Prism XUL, and .NET framework, but it is not limited thereto as well.

In other words, the platform is a combination of hardware and software used to run software applications. Such a platform may simply refer to one operating system or a computer architecture or the both. For example, the platform familiar to the general public is Microsoft's Windows running on x86 architecture. Other well-known platforms of desktop computers include Linux and OS X.

Moreover, in this specification of the present invention, a "virtual machine" refers to a software emulated computing environment. Particularly, it is a term intended to refer to a "hardware virtual machine" which is multiplexed by virtualizing a physical computing device and which is served as a basis for a virtual machine to run respective operating systems. It is distinguished from a "process virtual machine" such as a Java virtual machine for executing an isolated process. The main advantage of the hardware virtual machine is that each environment running respective operating systems may co-exist and operate within the same single computer by keeping the respective operating systems completely isolated from one another.

In this specification of the present invention, a "virtual machine image" indicates states of the virtual machine, that is, it means all the data corresponding to the states of the virtual machine and is recorded in a form of file.

Meanwhile, a "container" described here refers to respective instances created upon dividing workspaces of a user of an OS into multiple isolated instances through operatingsystem-level virtualization allowed by the OS kernel. Such containers may be used under the status of that they are mutually isolated from each other and that they may co-exist in the same physical computer.

Furthermore, a term "provisioning" described here means that it prepares computing resources for immediate use when necessary by allocating, deploying, distributing the computing resources in advance based on requirements of a user. And a term "software provisioning" indicates such a provisioning is done in a software way.

Moreover, in the specification of the present invention, a "server application", as well-known to those skilled in the pertinent art, may include a web server application, a WAS application, and a database application etc., and examples are not limited to the enumerated.

Additionally, a term "a device support another device to" and its variations throughout detailed description and claims of the present invention means that the subject recited, a device, execute a function or a role in the recitation in an indirect way, e.g. in a way to transmit and receive signals used for performing the function or the role to and from said another device. That is, the device helps or instructs said another device to execute the function and the role recited and directly or indirectly receives a result of the execution from said another device.

Besides, throughout the detailed description and the claims of the present invention, a term "include" and its variations are not intended to exclude other technical features, additions, components, or steps. Other certain objects, advantages and features of the present invention may be revealed to those skilled in the pertinent art partly from the description and partly from embodiments of the present invention. The embodiments and drawings below are provided as examples and the present invention is not intended to be limited thereof.

Furthermore, the present invention includes all the possible combinations of example embodiments specified in this specification. It is to be appreciated that the various embodiments of the present invention, although different, are not necessarily to be mutually exclusive. For example, a particular feature, structure, or characteristic described herein in connection with one embodiment may be implemented within other embodiments without departing from the spirit and the scope of the present invention. In addition, it is to be appreciated that the position or arrangement of individual elements within each disclosed embodiment may be modified without departing from the spirit and the scope of the present invention. As such, the following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functions throughout the several views.

Unless otherwise indicated herein or otherwise clearly contradicted by context, items referred to in the singular are intended to encompass a plurality of items, unless the context otherwise requires. Hereinafter, preferred embodiments of the present invention will be described by referring to accompanying drawings so that those skilled in the art may easily implement the present invention.

FIG. 1 is a block diagram schematically illustrating a configuration of a server 100 for providing a trial environment to enable a user to try out an application in accordance with the present invention. In FIG. 1, the server 100 includes a communication part 110 and a processor 120.

Figure 2:
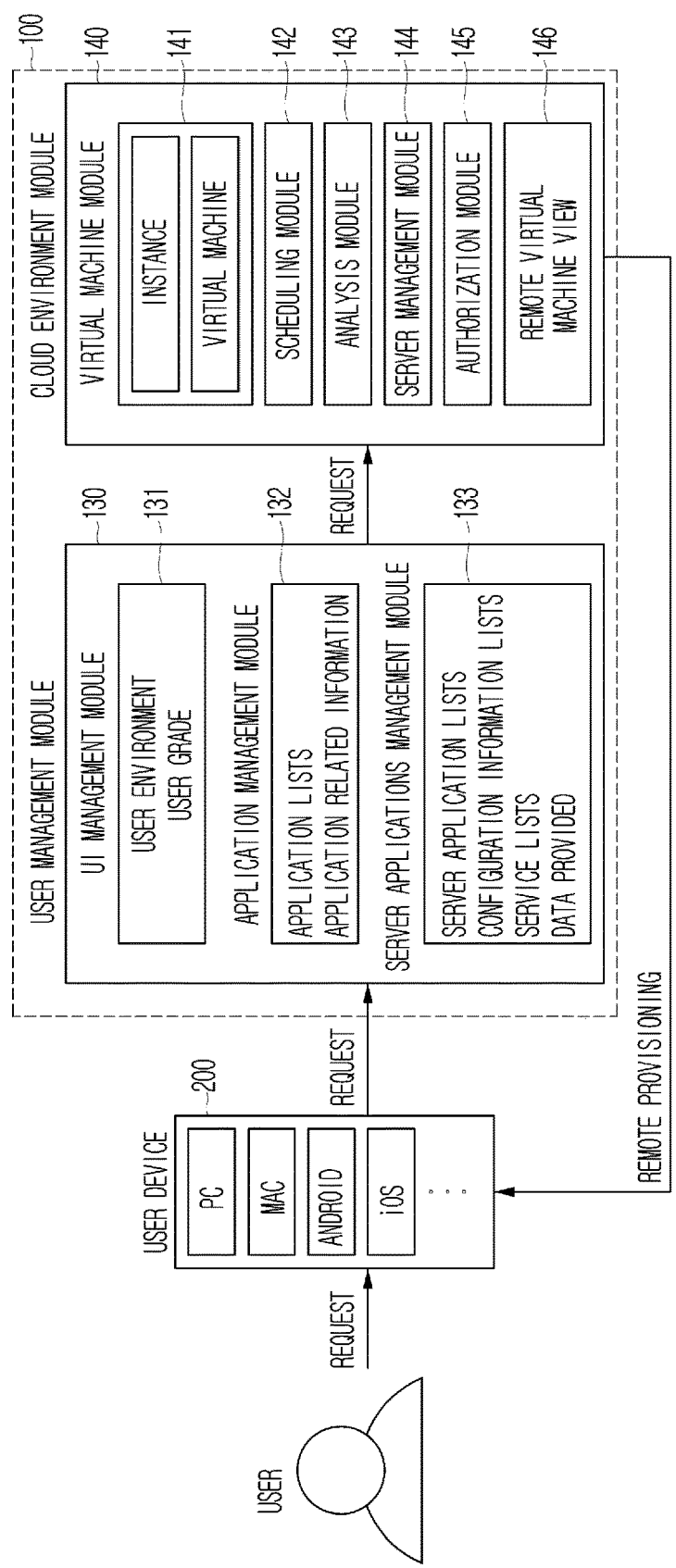
FIG. 2 is a conceptual drawing exemplarily illustrating respective modules in a whole configuration of the server for providing a trial environment to try out an application in accordance with the present invention.

In addition, FIG. 2 is a conceptual drawing exemplarily illustrating respective modules in a whole configuration of the server 100. Referring to FIG. 2, each component may be a module implemented as hardware or software or a combination of the both. Although in FIG. 2, the respective modules are illustrated as all included in the server 100, at least one of the modules may be implemented by a separate device connected to the server 100.

Specifically, referring to FIG. 2, the server 100 may include: a user management module 130 which manages information related to a user and an application; and a cloud environment module 140 connected to the user management module 130. Herein, the user management module 130 and the cloud environment module 140 are respectively connected to the user device 200 and may transmit and receive a signal to and from the user device 200.

First of all, the user management module 130 may include: a user interface management module 131 which manages a user interface displayed on the user device 200 with a support of the server 100; and an application management module 132 which manages information on trial applications.

The user interface management module 131 included in the user management module 130 performs a function of handling and managing related information of the user such as environmental information that includes information on both hardware specification and a platform of the user device 200, and grade information that reveals a trial level of the user. Herein, the trial level is a piece of information serving as a criterion to set for the user a degree of availability of the trial environment to try out applications as the present invention proposed.

For example, the trial level may be classified into standard user grade, professional user grade, and enterprise user grade. And according to the trial level, user rights which include types of the trial applications provided by the server, a scope of functions being tried out in the trial applications, and an allowable period for trying out the trial applications, i.e. a trial period, etc. may be set differently for the user depending on the grade that the user has. Typically, the user of the professional user grade rather than the standard user grade and the user of the enterprise user grade rather than the professional user grade have more chances to try out diverse types of the trial applications and different scopes of functions thereof, with longer trial period.

Moreover, the application management module 132 included in the user management module 130 performs a function of handling and managing lists of the trial applications and related information on those applications. Herein, the related information on a trial application may include at least one of the following: developers of the trial application, whether the trial application is free or not, price of it, appropriate platforms to run the trial application, minimum hardware specification, and recommended hardware specification, but it is not limited thereto. The minimum hardware specification means the minimum specification of the user device on which the trial application may run, and it is a piece of information that may be estimated objectively. On the other hand, the recommended hardware specification means the specification of the user device on which the trial application may be run smoothly. It is a piece of information that may be subjectively estimated and given by an administrator of a server or the developers of the trial application.

Preferably, the application management module 132 may play a role on managing a wish list of the trial applications for the user; and favorably, the application management module 132 may include a purchase/payment module, which is not shown, capable of performing a purchasing procedure of a trial application.

As one example of the user management module 130, a server application management module 133 may be additionally included in the user management module 130 to separately manage information on server applications by distinguishing the server applications from other applications. The server application management module 133 performs a function of handling and managing a list of server applications, a list of configuration information corresponding to each of the server applications, a list of services provided by a server application, a list of data provided by server administrator(s) or developer(s) of the server application etc. for facilitating trial experiences of the server applications.

As an example, in case a server application is a web server application, the configuration information may be corresponding to types of web services provided by the server application and service ports of the web services. Typically, such configuration information is contained in a configuration file. For example, in a Linux operating system, configuration information of a specific HTTPD web server application, e.g. an Apache server application, is contained in a configuration file, e.g. named httpd.conf. Herein, one type of the web services may be, for example, a service of providing web pages and a service of providing enterprise management system etc., configuration information may be prepared for the respective types of the web services.

As another example, in case a server application is a database server application, data provided for facilitating a trial may be provided as a set of sample data to enable the user to try out functions supported by a database server application. The set of sample data provided may be imported to try out a server application.

As still another example, in case a server application is a WAS server, configuration information or data suitable for optional services based on a servlet, EJB, or other various Javascript/Node.js/Anguler.JS may be provided to promote a trial for the application.

Referring to FIG. 2 again, the cloud environment module 140 performs a function of creating, reproducing and deleting virtual machine images and includes a virtual machine module 141 providing a specific virtual machine instance for individual users and respective applications from the virtual machine images as a trial environment and a remote virtual machine viewer 146 for remotely providing the trial environment to the user.

Besides, the cloud environment module 140 in accordance with one example embodiment may include a scheduling module 142 that limits functions and the trial period of the application to be tried out and executes a scheduling task which notifies or extends the trial period etc.

In addition, the cloud environment module 140 in accordance with another example embodiment may include an analysis module 143 for recording, as log information, information with respect to executions of at least part of steps included in the method for providing a trial environment for the application and analyzing the log information.

Furthermore, the cloud environment module 140 may include a server management module 144 that performs a function of separately providing a trial environment for the server application by distinguishing it from other applications. The server management module 144 may play a role on managing information on individual services, e.g. service ports or settings of containers, provided by the server application.

Finally, the cloud environment module 140 may include an authorization module 146 that performs a function of determining whether or not the user has a right to access the trial environment and manipulate the application by identifying the user, and that allows the user to manipulate the application by referring to the right of the user.

A method for providing the trial environment of the application in the present invention will be described in details below.

Figure 3:
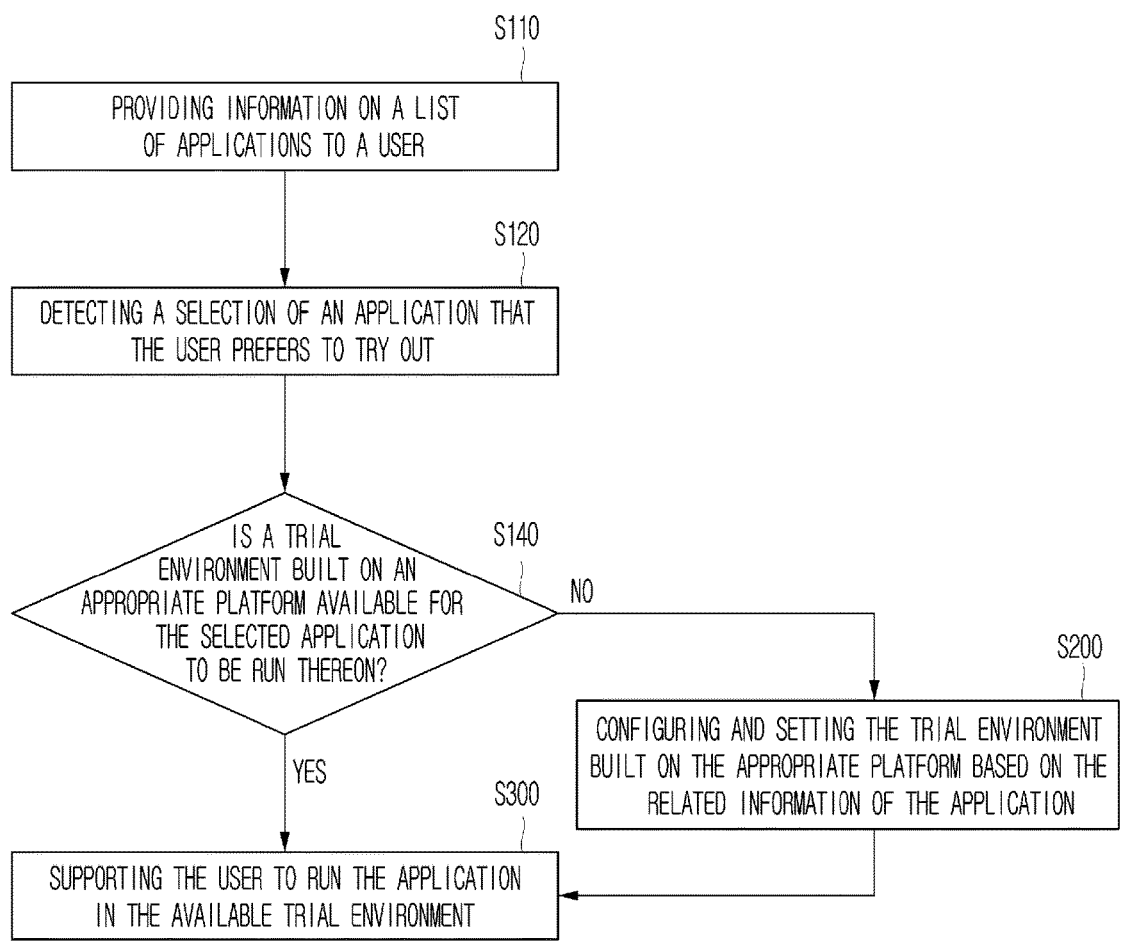
FIG. 3 is a flowchart comprehensively exemplifying each step of a method for providing a trial environment to try out an application in accordance with the present invention.

FIG. 3 is a flowchart comprehensively exemplifying each step of the method for providing the trial environment to enable the user to try out the application in accordance with the present invention.

Referring to FIG. 3, the method for providing the trial environment to enable a user to try out the application in the cloud environment in accordance with the present invention includes a step S120 of the server 100 detecting a selection of the application that the user prefers to try out and a step S140 of the server 100 acquiring or supporting another device to acquire information on a platform that is appropriate to run the application from related information of the application, and determining or supporting another device to determine whether or not the trial environment built on the appropriate platform is available for the application to be run on the trial environment.

Preferably, the method may further include a step S110 of the server providing to the user a list of applications capable of being tried out before the user selects the application that the user aims to try out. In this case, information on the list of applications may include information with respect to whether or not individual applications included in the list of the applications may be run on the user device, where the information is determined based on the information acquired from the user device.

In addition, if the trial environment is detected as not available by referring to a result of the determination made above, the method further includes a step S200 of the server 100 configuring and setting or supporting another device to configure and set the trial environment built on an appropriate platform to be available on the basis of the related information of the application.

In accordance with a first example embodiment regarding the step S200, the step S200 includes a step S220 (not shown) of the server 100 determining whether or not a second virtual machine image on which the application is installed is available; a step S240 (not illustrated) of the server 100, if the second virtual machine image is not available, creating the second virtual machine image by reproducing a first virtual machine image corresponding to at least prescribed hardware specification and the appropriate platform and installing the application on the second virtual machine image; and a step S260 (not illustrated) of the server 100 creating a virtual machine instance from the second virtual machine image as the trial environment built on the appropriate platform for the user experience of the application. At least some of the aforementioned steps S220 to S260 may be performed through the virtual machine module 141 as stated above.

Herein, the prescribed hardware specification may be the minimum hardware specification of the application, the recommended hardware specification thereof, or hardware specification requested by the user. In addition, the prescribed hardware specification may be hardware specification of the user device that the user uses.

In addition, the first virtual machine image herein refers to a specific hardware specification and an image of a platform-specific virtual machine which is configured for the platform, and the second virtual machine image refers to an image of an application-specific virtual machine with a specific application installed on and equipped with the first virtual machine image. For example, steps S220 to S260 correspond to a series of steps of creating a user-specific virtual machine instance from the application-specific virtual machine as a trial environment by creating the image of the application-specific virtual machine from the image of the platform-specific virtual machine or reusing an existing application-specific virtual machine. Such a series of the steps in accordance with the present invention may be automated by software and it is called software provisioning.

That is, the trial environment may be prepared by referring to both information on the user and on the application, and the step S200 may limit functions of the application and the trial period for the application according to a pre-defined licensing policy based on at least one of the related information of the user and the related information of the application which includes the application hardware specification, the application platform, and the trial level of the user etc. Herein, the related information of the application and the related information of the user may be respectively acquired through the application management module 132 and the user interface management module 131.

As a first example, in case the functions of the application and the trial period for the application are limited, the server 100, in response to a request of the user, may acquire information on trial status of the application including remaining trial period of the application and accumulated trial period to date, and may provide to the user the acquired information on the trial status.

As a second example, the method may further include a step of the server 100 extending the trial period for the application of the user if the user sends a request for time extension of the trial period to an administrator of the server and the administrator approves it.

As a third example, the method may further include a step of the server 100, if remaining period until an expiration of the trial period is detected as being less than a predetermined period or the expiration of the trial period is detected, notifying the user of the fact that the trial period is going to be expired or the trial period has been expired by using contact information acquired from the related information of the user. Herein, the contact information includes SMS, e-mail, fax, etc., but it is not limited thereto.

The foregoing examples are not mutually exclusive, but may be implemented in various combinations. At least part of the steps such as limiting the functions and the trial period of the applications, providing information on the trial status thereof, and extending and notifying the trial period of the applications stated in the examples above may be performed by the scheduling module 142.

Figure 4:
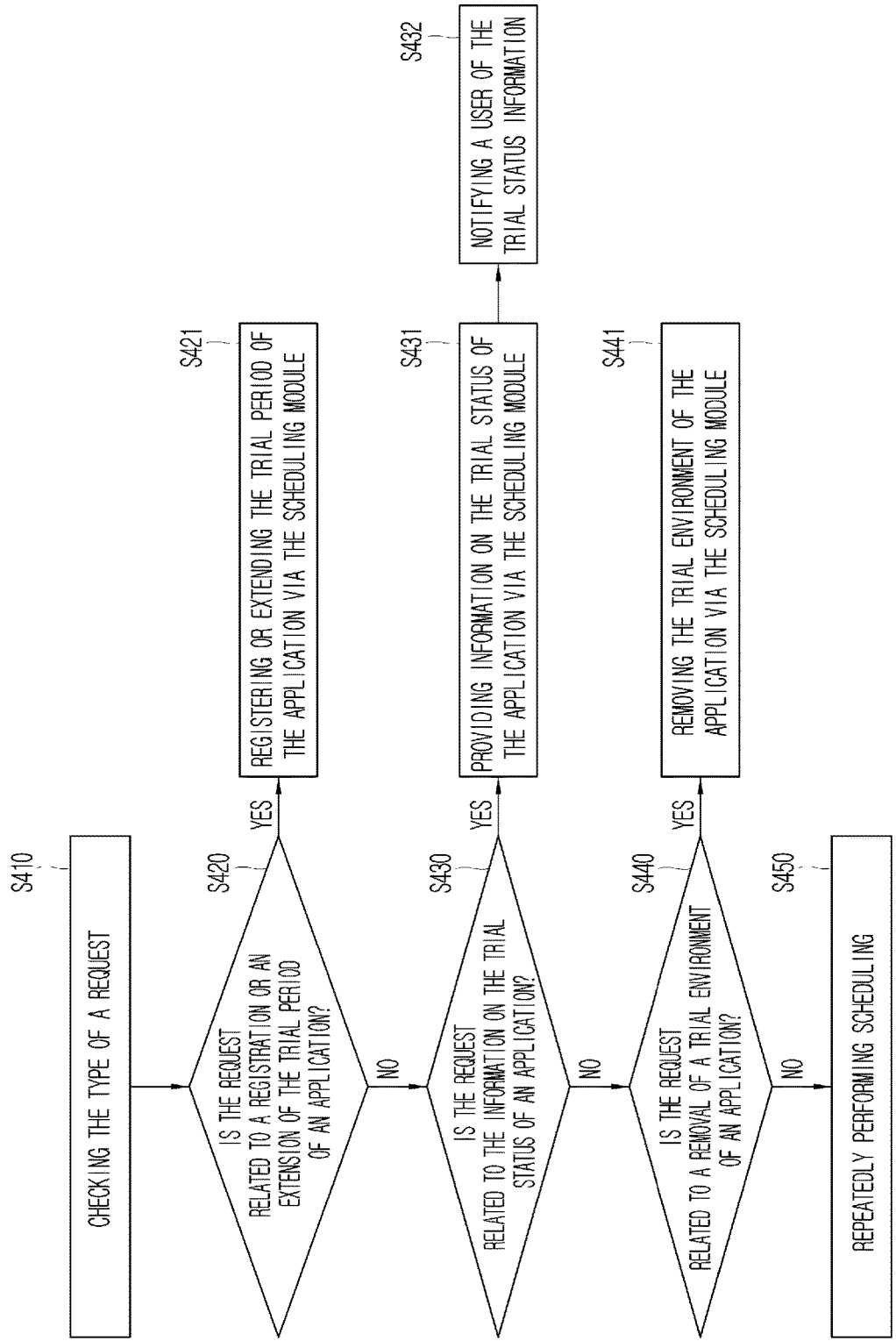
FIG. 4 is a flowchart exemplarily illustrating a scheduling approach for processing requests of notification or extension of a trial period, of providing information on trial status and of removing a trial environment upon limiting functions and the trial period under the method for providing the trial environment to try out the application in accordance with the present invention.

Note that FIG. 4 is a flowchart exemplarily illustrating a scheduling approach capable of implementing all the three examples aforementioned. The server 100 checks a type of a request at the step of S410.

If the type of the request is determined as being related to a registration or an extension of a trial period at the step of S420, the server 100 may allow the scheduling module 142 to register or extend the trial period of the application.

Next, if the type of the request is determined as being related to information on the trial status at the step of S430, the server 100 may allow an authorized person such as the administrator of the server or developer(s) of the application to be provided with the trial status for the application through the scheduling module 142 at the step of S431.

Further, the server 100 may notify the user of the information on the trial status described above at the step of S432.

In addition, if the type of the request is determined as being related to a removal of a trial environment at the step of S440, the server 100 may remove the trial environment of the application through the scheduling module 142.

At the next step of S450, the server 100 may perform or support another device to perform scheduling of at least one of the trial environments, repeatedly. The fact that such scheduling may be performed by the scheduling module 142 has been described as above.

In the first example embodiment, the step S240 may include a step S242 (not shown) of the server 100 determining whether or not the first virtual machine image corresponding to the appropriate platform and the at least prescribed hardware specification of the application is available; a step S244 (not shown) of the server 100 newly creating the first virtual machine image corresponding to the appropriate platform and the prescribed hardware specification of the application if the first virtual machine image is not available; and a step S246 (not shown) of the server 100 creating the second virtual machine image by reproducing the first virtual machine image corresponding to the appropriate platform and the prescribed hardware specification of the application and installing the application on the second virtual machine image. In other words, the steps S242 to S246 correspond to a series of the steps of creating a new platform-specific virtual machine image and an application-specific virtual machine image from the platform-specific virtual machine image if the platform-specific virtual machine image is not available.

Meanwhile, in the second example embodiment where the server applications are mainly being disclosed as trial targets, the step S200 includes a step S220' (not illustrated) of the server 100 determining whether or not an application-specific container on which an application is installed is available; a step S240' (not illustrated) of the server 100 creating the application-specific container and installing the application in the application-specific container if the application-specific container is not available; and a step S260' (not illustrated) of the server 100 reproducing the application-specific container and creating the trial environment built on the appropriate platform for allowing a user to try out the application by using the reproduced container. Herein, each application has its own application-specific container. That is, applications A, B and C are installed respectively on application-specific containers dedicated for each of the applications. For a reference, the server applications take a way of building a container since services of the server applications can be directly provided by the server 100 without creating a virtual machine instance, which is different from other applications.

In the second example embodiment, the step 200 may further include a step S270' (not illustrated) of the server 100 setting the application in the trial environment according to pre-defined basic setting information corresponding to the application; and a step S280' (not illustrated) of the server 100 loading sample data for facilitating the user experience of the application into the trial environment. Herein, the meanings of the pre-defined basic setting information and the sample data for facilitating the user experience are the same as those disclosed above by referring to FIG. 2.

At least part of the steps S220' to S280' may be performed by the server management module 144.

Referring to FIG. 3 again, the method may further include a step S300 of the server 100 enabling the user to run or supporting another device to enable the user to run the application in the available trial environment.

Preferably, at the step S300, the server 100 may support the device of the user to access the trial environment built on the appropriate platform and may support the device to start a remote trial process capable of operating the application. In this case, the step S300 may also include a step S320 (not illustrated) of the server 100 determining whether or not the device of the user has a right to access the trial environment and to operate the application; and a step S340 (not illustrated) of the server 100, if it is determined that the right is granted to the device of the user, supporting the device of the user to start the remote trial process that allows the device to access the trial environment and to operate the application. The support of starting the remote trial process may be performed by the remote virtual machine viewer 145 and at least part of the steps S320 and S340 may be performed by the authorization module 146.

In one example embodiment, the step S300 may include a step (not illustrated) of the server 100 running the trial environment, i.e., a container or a virtual machine instance, in the cloud environment, and a step (not illustrated) of the server 100 transmitting and receiving signals to or from a remote trial client, e.g. "Remote Desktop Connection" in Microsoft Windows Operating System, provided to the device of the user through the remote virtual machine viewer 145 to allow the user to manipulate the application by accessing the trial environment.

Figure 5:
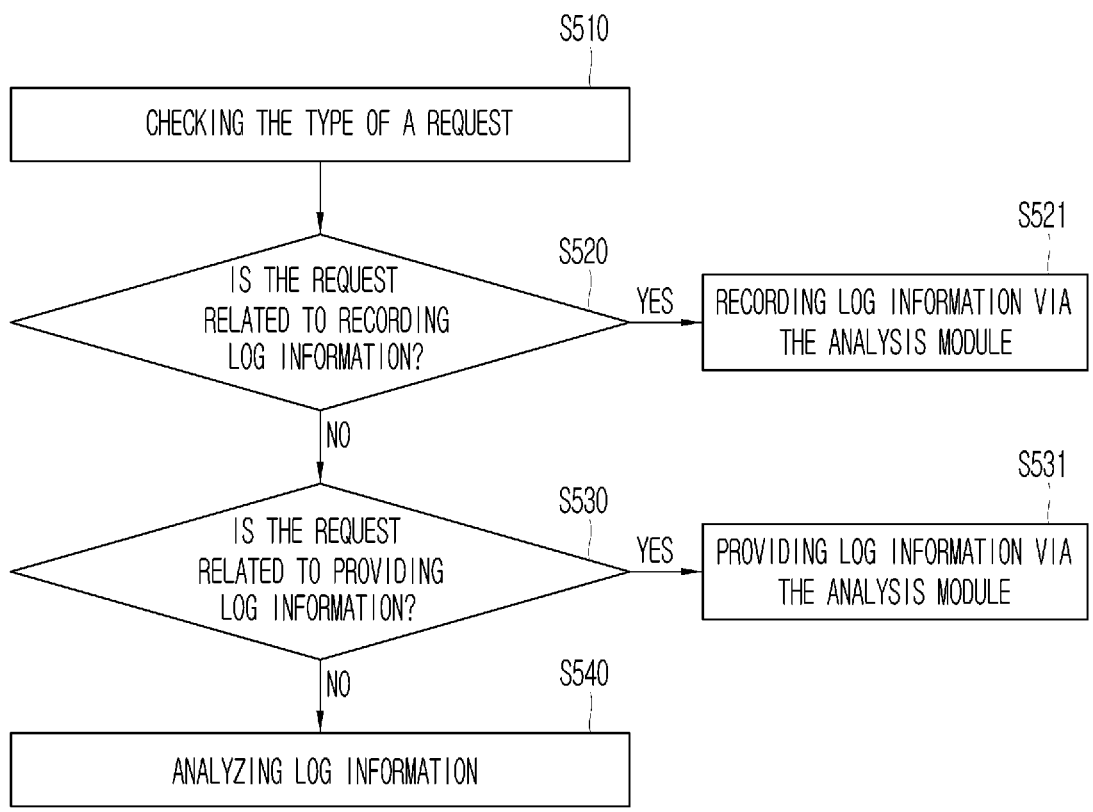
FIG. 5 is a flowchart exemplarily showing an approach for recording and analyzing log information which is related to information on execution of at least part of the respective steps of the method for providing the trial environment to try out the application in accordance with the present invention.

Additionally, FIG. 5 is a flowchart exemplarily showing an approach for recording, as log information, information on at least one result of execution for at least part of the steps included in the method for providing the trial environment of the application, analyzing the information, and providing the information to an administrator of a server or developer(s) of the application etc. for querying.

Referring to FIG. 5, the method may further include: steps S520 and S521 of the server 100 recording, as log information, information on execution of at least part of the steps included in the method; a step S540 of the server 100 acquiring usage pattern of the user by analyzing the recorded log information; and steps S530 and S531 of providing the information on the usage pattern to the administrator of the server. Herein, the log information may include at least one of a period, a frequency, and an accumulated time that the user manipulates the application, but it is not limited thereto. For example, the log information may include information on when the user mainly or typically uses a particular application. Such recording and analyzing processes may be performed by the analysis module 143. In case the analysis module 143 and the scheduling module 142 are provided, the analysis module 143 may acquire information on the application being provided by the trial environment in real time from the scheduling module 142.

Lastly, the method may include a step of the server 100 nullifying or supporting another device to nullify a cheating of the user in the trial environment. Herein, the cheating includes at least one of the following: changing system date and time of the trial environment, changing a host name thereof, and changing hardware specification including number of processors, e.g. CPU etc., a capacity and a type of a memory, e.g. DDR2, DDR3 etc., a capacity and a type of a mass storage, e.g. types such as SSD and HDD and interface spec such as SCSI, IDE, EIDE, SATA, SATA2, and SATA3. However, it is not limited thereto. For example, those skilled in the art may come up with several ways to prevent changing the system date and the system time of the trial environment, one of which is consistently matching a system date and a system time of respective virtual machine instances (corresponding to the trial environments) with those of a host system, i.e. the server itself. The ways to prevent the user from changing the host name of the trial environment is also well-known to those skilled in the art and thus will not be disclosed or described in detail herein.

All the foregoing example embodiments of the present invention provide an effect of being capable of conveniently trying out various applications without having to install the applications on a terminal device of a user.

The benefits of the present invention described herein by the aforementioned example embodiments include not only that it is not necessary for individual users to pay attention to the installation and uninstallation or deletion of a trial application, but also that a server administrator may effectively use and manage a trial environment disclosed, e.g. update or delete it, since the trial environment for all the trial applications is implemented via software provisioning in a cloud environment. And another advantage may be that users and application developers may get a synergy effect because the application developers may increase the chances of advertising while the users may experience a convenient way of trying out the applications. Still another advantage may be the application developers are being able to consider more favorable licensing policies by recording and analyzing information of the users with respect to their trials.

The present invention has an effect of easily configuring and deleting various trial applications by creating and providing the trial environment corresponding to the hardware specification and the platform of the device of the user in the cloud environment without directly installing the trial applications on the device of the user before the user purchases the trial applications.

The present invention has another effect of effectively using and managing the virtual machine instances which are the trial environments respectively created from the virtual machine images for the individual users, by once creating and configuring the respective platform-specific virtual machine images on which the respective applications may be installed and used through software provisioning in the cloud environment and by keeping on using the existing platform-specific virtual machine images even when an upgrade or a subsequent version of the applications is released.

Hence, the present invention has an effect of providing, to the users, the trial environments for the applications running on the various platforms with saving the resources, e.g. costs and time, for repeatedly configuring the trial environments created for allowing the users to try out the applications fitting for the respective platforms.

In addition, the present invention has an effect of the server providing, to the administrator of the server or the user, information on the trial period of the applications and the information on which applications are used by the users, wherein the server handles application-specific containers created by the users.

Based on explanation on the aforementioned example embodiments, those skilled in the art can clearly understand that the present invention may be achieved through a combination of software and hardware or only through hardware. The objects of the technical solution of the present invention or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present invention and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method for providing a trial environment to enable a user to try out at least one application in a cloud environment, comprising steps of:
   (a) a server, if a selection of an application that the user prefers to try out is detected, acquiring or supporting another device to acquire information on a platform that is appropriate to run the application from related information of the application, and determining or supporting another device to determine whether or not the trial environment built on the appropriate platform is available for the application to be run thereon;
   (b) the server, if the trial environment is detected as not available by referring to a result of the determination, configuring and setting or supporting another device to configure and set the trial environment built on the appropriate platform to be available on the basis of the related information of the application; and
   (c) the server enabling the user to run or supporting another device to enable the user to run the application in the available trial environment,
   wherein the step of (b) includes steps of:
   (b1) the server determining whether or not a second virtual machine image on which the application is installed is available;
   (b2) the server, if the second virtual machine image is not available, creating the second virtual machine image by reproducing a first virtual machine image corresponding to and compatible with at least prescribed hardware specification and the appropriate platform and installing the application on the second virtual machine image; and
   (b3) the server creating a virtual machine instance from the second virtual machine image as the trial environment built on the appropriate platform for the user experience of the application, and
   wherein, at the step of (c), the server supports a device of the user to access the trial environment built on the appropriate platform and supports the device to start a remote trial process capable of operating the application.

2. The method of claim 1, wherein the step of (c) includes steps of:
   (c1) the server determining whether or not the device of the user has a right to access the trial environment and to operate the application;
   (c2) the server, if it is determined that the right is granted to the device of the user, supporting the device of the user to start the remote trial process that allows the device to access the trial environment and to operate the application.

3. The method of claim 1, wherein the step of (b2) includes steps of:
   (b2-1) the server determining whether or not a first virtual machine image corresponding to and compatible with the appropriate platform and the prescribed hardware specification of the application is available;
   (b2-2) the server, if the first virtual machine image is not available, newly creating the first virtual machine image corresponding to and compatible with the prescribed hardware specification of the application and the appropriate platform; and
   (b2-3) the server creating the second virtual machine image by reproducing the first virtual machine image corresponding to and compatible with the prescribed hardware specification of the application and the appropriate platform and installing the application on the second virtual machine image.

4. The method of claim 1, before the step of (a), further comprising a step of:
   (a0) the server providing to the user a list of applications capable of being tried out.

5. The method of claim 1, wherein the step of (b) includes steps of:
   (b1') the server determining whether or not an application-specific container is available;
   (b2') the server, if the container is not available, creating the container and installing the application in the container; and
   (b3') the server reproducing the container, and creating the trial environment based on the appropriate platform by using the reproduced container.

6. The method of claim 5, wherein the step of (b) further includes steps of:
   (b4') the server setting the application in the trial environment according to pre-defined basic setting information corresponding to the application; and
   (b5') the server loading sample data into the trial environment for facilitating the user experience of the application.

7. The method of claim 1, wherein the trial environment is prepared by referring to both information on the user and information on the application, and at the step of (b), functions of the application and a trial period for the application are limited based on the user's information and the information of the application according to a pre-defined licensing policy.

8. The method of claim 1, wherein the server records information on execution of at least part of the steps included in the method as log information, analyzes usage pattern of the user from the recorded log information, and provides it to an administrator of the server, where the log information includes at least one of a period, a frequency, and an accumulated time that the user uses the application.

9. The method of claim 1, wherein the server nullifies or supports another device to nullify a cheating of the user in the trial environment, and the cheating includes at least one of the following: changing system date and time of the trial environment, changing a host name thereof, and changing hardware specification.

10. A server for providing a trial environment to enable a user to try out at least one application in a cloud environment, comprising:
 a communication part for detecting a selection of an application that the user prefers to try out; and
 a processor for (i) acquiring or supporting another device to acquire information on a platform that is appropriate to run the application from related information of the application if the selection of the application that the user prefers to try out is detected, (ii) determining or supporting another device to determine whether or not the trial environment built on the appropriate platform is available for the application to be run thereon, (iii) configuring and setting or supporting another device to configure and set the trial environment built on the appropriate platform to be available on the basis of the related information of the application if the trial environment is detected as not available by referring to a result of the determination, and (iv) enabling the user to run or supporting another device to enable the user to run the application in the available trial environment,
 wherein the processor is configured to:
 determine whether or not a second virtual machine image on which the application is installed is available,
 create the second virtual machine image, if the second virtual machine image is not available, by reproducing a first virtual machine image corresponding to and compatible with at least prescribed hardware specification and the appropriate platform,
 install the application on the second virtual machine image,
 create a virtual machine instance from the second virtual machine image as the trial environment built on the appropriate platform for the user experience of the application, and
 support a device of the user to access the trial environment built on the appropriate platform and to support the device to start a remote trial process capable of operating the application.

11. The server of claim 10, wherein the processor is configured to determine whether or not the device of the user has a right to access the trial environment and to operate the application, and if it is determined that the right is granted to the device of the user, the processor is configured to support the device of the user to start the remote trial process that allows the device to access the trial environment and to operate the application.

12. The server of claim 10, wherein the processor is configured to determine whether or not a first virtual machine image corresponding to and compatible with the appropriate platform and at least the prescribed hardware specification of the application is available, to newly create the first virtual machine image corresponding to and compatible with the prescribed hardware specification of the application and the appropriate platform if the first virtual machine image is not available, and to create the second virtual machine image by reproducing the first virtual machine image corresponding to and compatible with the prescribed hardware specification of the application and the appropriate platform, and then to install the application on the second virtual machine image.

13. The server of claim 10, wherein the processor is configured to provide to the user a list of applications capable of being tried out.

14. The server of claim 10, wherein the processor is configured to determine whether or not an application-specific container corresponding to the application is available, to create the container if the container is not available, to install the application in the container, to reproduce the container, and to create the trial environment based on the appropriate platform by using the reproduced container.

15. The server of claim 14, wherein the processor is configured to set the application in the trial environment according to pre-defined basic setting information corresponding to the application, and to load sample data into the trial environment for facilitating the user experience of the application.

16. The server of claim 10, wherein the trial environment is prepared by referring to both information on the user and information on the application, and the processor is configured to limit functions of the application and a trial period for the application based on the user's information and the information of the application according to a pre-defined licensing policy.

17. The server of claim 10, wherein the processor is configured to record information on execution of at least part of the steps included in the method as log information, to analyze usage pattern of the user from the recorded log information, and to provide it to an administrator of the server, where the log information includes at least one of a period, a frequency, and an accumulated time that the user uses the application.

18. The server of claim 10, wherein the processor is configured to nullify or to support another device to nullify a cheating of the user in the trial environment, and the cheating includes at least one of the following: changing system date and time of the trial environment, changing a host name thereof, and changing hardware specification.

* * * * *